United States Patent [19]

Ungemach et al.

[11] Patent Number: 5,236,036
[45] Date of Patent: Aug. 17, 1993

[54] DEVICE FOR DELIVERING CORROSION OR DEPOSITION INHIBITING AGENTS INTO A WELL BY MEANS OF AN AUXILIARY DELIVERY TUBE

[76] Inventors: Pierre Ungemach, 2, rue Rameau, F-60300 Senlis; Roland Turon, 6 Allée Richard-Wagner, F-93420 Villepinte; Raymond Lucet, 41 Rue de Marolles, F-94370 Sucy En Brie, all of France

[21] Appl. No.: 773,656
[22] PCT Filed: Feb. 22, 1991
[86] PCT No.: PCT/FR91/00149
§ 371 Date: Oct. 22, 1991
§ 102(e) Date: Oct. 22, 1991
[87] PCT Pub. No.: WO91/13235
PCT Pub. Date: Sep. 5, 1991

[30] Foreign Application Priority Data

Feb. 22, 1990 [FR] France .................. 90 02207

[51] Int. Cl.$^5$ ............... E21B 17/20; E21B 19/22
[52] U.S. Cl. ................. 166/77; 138/139; 138/153; 138/174; 166/242
[58] Field of Search ............. 166/242, 384, 385, 77, 166/67; 138/138, 139, 127, 153; 174/47

[56] References Cited

U.S. PATENT DOCUMENTS

| | | | |
|---|---|---|---|
| 3,234,723 | 2/1966 | Brown | 174/47 |
| 3,526,086 | 9/1970 | Morgan | 138/153 X |
| 4,091,843 | 5/1978 | Mikes et al. | 138/127 |
| 4,256,146 | 3/1981 | Genini et al. | 138/139 X |
| 4,336,415 | 6/1982 | Walling | 174/47 |
| 4,470,621 | 9/1984 | Irvine | 285/114 |
| 4,570,705 | 2/1986 | Walling | 166/77 |
| 4,619,323 | 10/1986 | Gidley | 166/242 X |
| 5,018,583 | 5/1991 | Williams | 166/385 |

*Primary Examiner*—Hoang C. Dang
*Attorney, Agent, or Firm*—Larson and Taylor

[57] ABSTRACT

A new auxiliary injection tube concept is disclosed for injecting a fluid containing corrosion and/or deposit inhibiting agents into a well from the surface, without stopping working. The auxiliary injection tube includes a tube 10 conveying the injected agents. The tube is coated with a material 11 which is inert with respect to to the fluid collected by the well. Support cables 12, disposed about the tube 10 and also coated with material 11, provide both secondary protection of the tube 10 in the case of damage to coating 11 and the mechanical characteristics required for the injection tube, particularly during withdrawal from the well.

11 Claims, 2 Drawing Sheets

DEVICE FOR DELIVERING CORROSION OR DEPOSITION INHIBITING AGENTS INTO A WELL BY MEANS OF AN AUXILIARY DELIVERY TUBE

The present invention relates to a new concept of "auxiliary injection tube", called hereafter AIT for injecting a fluid containing corrosion and/or deposit inhibiting agents into a well, continuously from the surface without stopping working.

The invention is more particularly applicable to geothermal wells for combatting the effects of the corrosive and scale-forming thermochemistry of the geothermal fluid and preserving the long-life of the structures. These problems are well known in the Paris basin where numerous geothermal "doublets" (assembly formed of a production well for collecting the hot water of the reservoir and an injection well used for reinjecting the fluid into the reservoir after heat has been extracted) have been realized from the 1970s.

In these installations, the geothermal fluid-hot water whose temperature is between 50° C. and 85° C. and with high salinity (15 to 25 g/l)-comprises a dissolved gas phase enriched with $CO_2$ and $H_2O$ which confer thereon a slight acidity (pH of 6 to 6.4). This aggressiveness results, in certain zones of the harnessed reservoir, in repeated and accelerated damage to the structures because of the corrosion and deposits affecting the casings and clogging affecting the collection zone of the reservoir.

The damage mechanism may be summed up as follows:
- corrosion of the casing of the production well and, to a lesser extent, of the injection structure;
- dissolution of the iron of the casing with formation of a solution and formation of iron sulphides;
- deposits of the sulphides on the walls of the steel of the production casing without protection thereof (continuation of the corrosion kinetics under the deposits);
- entrainment in a particular form (solid suspensions) in the water produced and clogging of the heat exchangers, deposits/scaling of the injection casing and accumulation on the bottom and on the walls of the reservoir collection zone;
- increase of the pressure losses, reduction of the the flowrate of the geothermal loop and clogging of the structures and surface equipment.

To reduce, in the absence of eradicating, such damage different curative and preventive means may be used. Chemical preventive means are among the most widely employed. Based on the injection at the well bottom of corrosion/deposit inhibiting agents with respectively film-forming (corrosion) and dispersant (deposit) functions, these methods have not demonstrated all the required reliability in their geothermal applications, because in particular of the AIT resistance. The French patents 2 463 197 and 2 502 239 describe respectively an inhibiting method by injecting aliphatic amines and a well bottom injection device connected to the end of an auxiliary injection tube.

The very object of a well is to extract the highest possible flow; the space occupied by the AIT in the production string must then be minimum so as to limit the pressure losses. The usual 1" or 1"¼ carbon steel tubings are rapidly corroded in contact with the geothermal fluid. Recourse to 1" glass fibre "macaronis" regularly gives rise to operating troubles because of the mechanical characteristics of the material which is too weak.

The choice of noble alloys (Cr, Mo, Ni, etc. . . ), of a high cost, have the further drawback of making the solid structure fragile in the presence of dissolved H2S in a low concentration.

The invention, forming the subject matter of the present application, palliates the drawbacks of present day systems by using a metal web or core offering the mechanical characteristics required for this application, coated with a material which is inert with respect to the geothermal fluid, while remaining of a limited diameter.

Understanding of the invention and its advantages will be facilitated by the description of one embodiment illustrated by the accompanying figures, in which.

Figure 1:
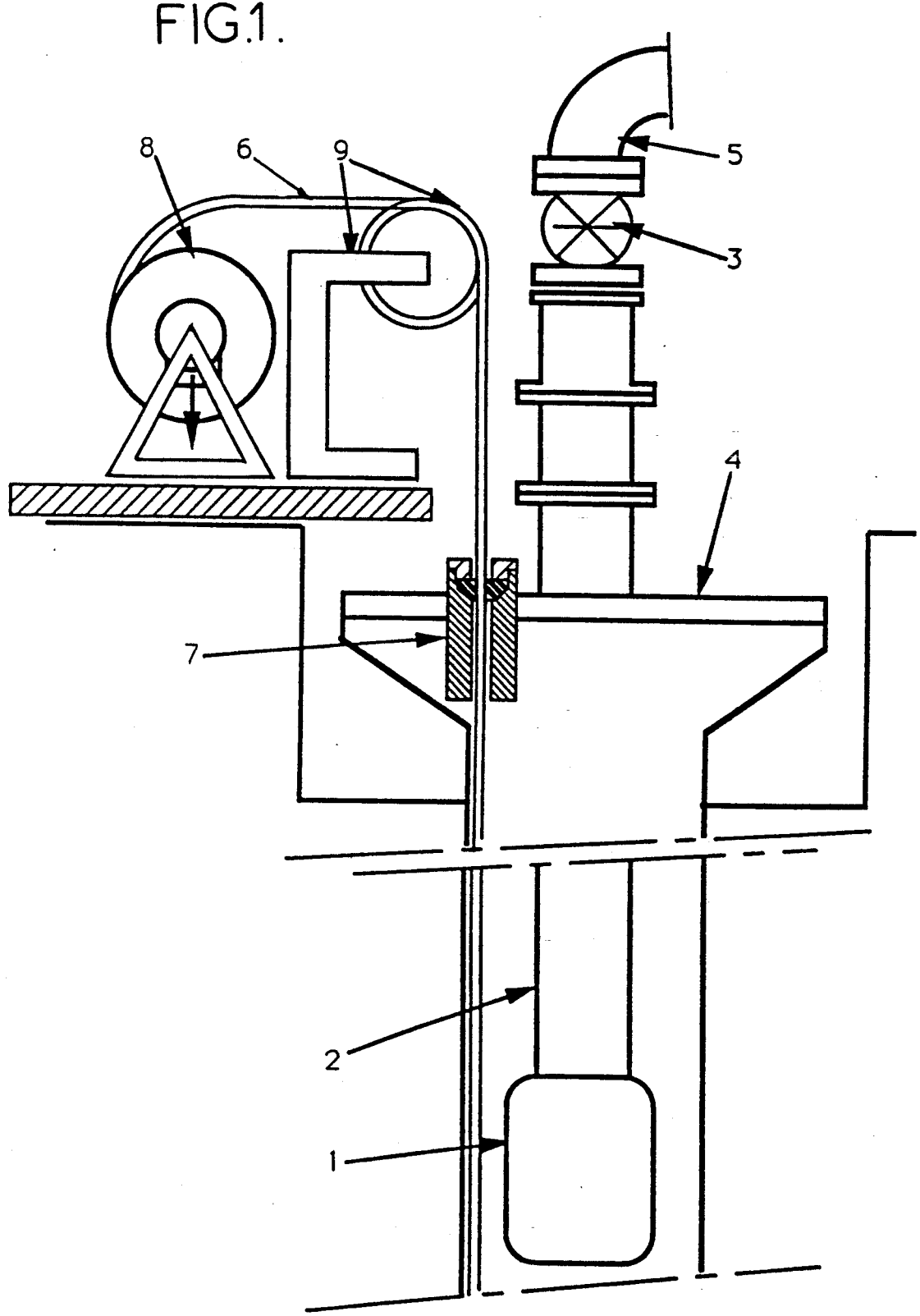
FIG. 1 is one example of auxiliary injection tube application in a production well equipped with an immersed pump.

The geothermal fluid, in FIG. 1, is driven by pump 1 through the production casing 2 and, after passing through the master valve 3 of the well head 4, is fed into the surface network 5 towards the exchangers. The auxiliary injection tube 6 is introduced into the well head 4 via a stuffing box 7 providing sealing of the AIT on the well head 4 even when the latter is moving, particularly when it is positioned. On the surface, the AIT is wound on a drum 8 for positioning the lower end of the AIT at the desired depth. Between drum 8 and the stuffing box 7, a sheave 9 supports the AIT with a winding radius compatible with its characteristics and holds it in position.

Figure 2:
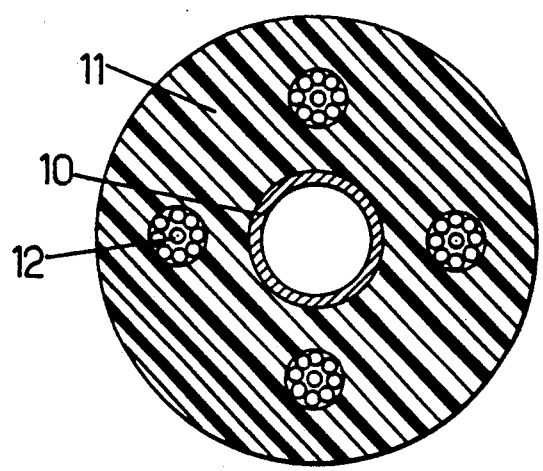
FIG. 2 is a section of an auxiliary injection tube formed in accordance with the present invention.

One example of the present invention is shown in FIG. 2. It comprises a mechanical tubular web or core 10 serving both for conveying the inhibiting agents and giving the mechanical characteristics required for injection of the inhibiting agents. The outside of the mechanical web is coated with a material 11 which is electrochemically inert with respect to the fluid collected; this coating may be formed with a continuous manufacturing machine, for embedding the tubular web 10 and the support cables 12 in the material 11. This construction may for example use extrusion or pultrusion techniques. In current techniques, the coating material 11 will be polymer material withstanding the mechanical stresses of use and thermal or chemical stresses. Some applications may for example justify the use of an elastomer, a polyamide or PTFE (Teflon) type materials, particularly in the case of temperature problems. The precise choice of the material forming the coating 11 will have to take into account the specific environment of the application: geothermics, oil, temperature, . . . Embedded in coating 11 and outside tube 10, steel reinforced support cables 12 protect the tube 10 in the case of damage or spot wear of coating 11, for example, following repeated lowering of measurement instruments into the well and confers on the AIT thus formed mechanical characteristics making positioning/removal operations possible in all safety, even if tube 10 breaks. The isolation of the metal masses in presence by the coating material 11 prevents the formation of galvanic couples.

In a preferred embodiment of the invention, the outer diameter of the finished AIT is 1" (25.4 mm), so as to remain within oil standards; web 10 uses a material having to withstand the inhibiting formulations and may be a 316 L stainless steel tube having an outer diameter of 10 mm and an inner diameter of 8 mm. Other applications may use, without being limited thereto, materials of the Incoloy 825, Inconel 624, Hastaloy type. The number of support cables 12, preferably four, may vary as a function of the applications. In FIG. 2, the outer diameter of cables 12 is 5 mm; this may vary as a function of the available standards and the dimensions of the other components. For example, in one embodiment, the AIT may have an outer diameter of 1"¼ (31.75 mm) and the web 10 an outer diameter of 12 mm and an inner diameter of 10 mm. For obvious reasons, the elongation coefficient of the material forming cables 12 is less than that of tube 10. This concept may be used not only in "resident" mode (permanently positioned) but also in temporary mode, mounted on a so-called "coiled tubing" unit for injections "on request".

A more detailed description of different variants of construction of an auxiliary injection tube forming the subject matter of the present invention will be given with reference to FIGS. 3a-d.

Figure 3A:
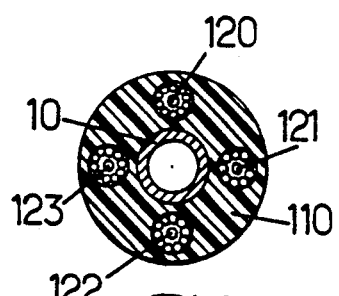
FIGS. 3a–3d show a sectional view of different particular embodiments of an auxiliary injection tube in accordance with the object of the present invention.

At FIG. 3a, the auxiliary injection tube 6 comprises the central metal tubular web 10 and a first cylindrical encapsulation 110, formed by material 11, coating the central metal tubular web 10. Furthermore, four support cables referenced 120, 121, 122, 123 are disposed in the first encapsulation, symmetrically with respect to the longitudinal axis of symmetry of the central web 10. Preferably, the support cables 120, 121, 122, 123 are placed facing each other in twos in orthogonal planes.

Figure 3B:
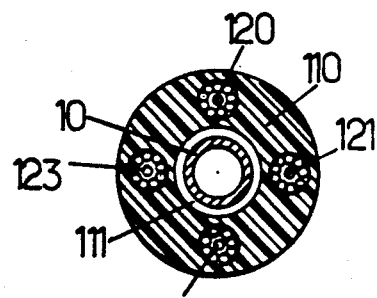

At same FIG. 3b, a second encapsulation 111 is provided, between the central metal tubular web 10 and the first encapsulation 110. This second encapsulation may advantageously be formed by a material chosen for providing a particular protection of the central metal tubular web 10, as a function of the chosen application.

Figure 3C:
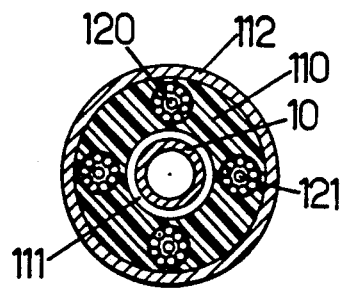
Figure 3D:
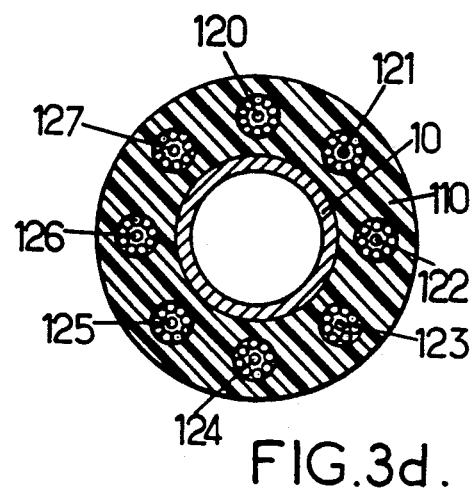

At FIG. 3c, a third encapsulation 112 is provided so as to coat the first encapsulation 110. This third encapsulation forming an external sleeve may be formed by a material chosen for reinforcing the tightness of the assembly to external agents. When the auxiliary injection tube is in use, as shown at FIG. 3d, it may be advantageous, in order to reinforce the mechanical strength of the AIT tube, while keeping its qualities of flexibility on winding, to provide eight support cables referenced 120 to 127. These cables are advantageously disposed symmetrically with respect to the longitudinal axis of symmetry of the central web.

By way of non limitative example, the first 110, second 111 and third 112 encapsulations may be chosen from the following materials:

| FIG. 3b | |
|---|---|
| 2nd encapsulation 111 | 1st encapsulation 110 |
| fluorine-containing polyamide (PVDF) | PA 11 |
| Polyamide 11 (PA11) | Polypropylene copolymer (PP) |
| PVDF | PP |
| Chlorotrifluoroethylene (Halar) | PA 11 |
| Halar | PVDF |

| FIG. 3c | | |
|---|---|---|
| 1st encapsulation | 2nd encapsulation | 3rd encapsulation |
| 110 | 111 | 112 |
| PP | PA 11 | EPDM/polypropylene |
| PP | PVDF | EPDM/polypropylene |

Furthermore, and advantageously, it will be noted that the support cables may be used in pairs for the transmission of electric control signals, which may be conveyed to the well bottom at the level of the injection head.

We claim:

1. A system for injecting corrosion and scale inhibiting agents into a well, from the surface, without stopping working of the well comprising:
   a well head for the well; and
   an auxiliary injection tube which extends through said well head and into the well for conveying the inhibiting agents, said auxiliary injection tube having a lateral symmetry and comprising
      a single tubular core made of metal located centrally in said injection tube and having a longitudinal axis of symmetry,
      a cylindrical encapsulation symmetrically about and completely coating said tubular core, said cylindrical encapsulation being made of a material which is inert with respect to a fluid collected by the well such that said tubular core is protected from the fluid, and
   at least four support cables located within said cylindrical encapsulation, said four support cables being disposed symmetrically with respect to the longitudinal axis of symmetry of said tubular core and facing each other in pairs disposed along two orthogonal planes, such that said cables give mechanical strength to said auxiliary injection tube for lowering and raising operations associated therewith and secondary mechanical protection to said tubular core in case of damage to said cylindrical encapsulation.

2. A system according to claim 1, characterized in that said auxiliary tube is made continuously in a great length and wound on a reel permitting ready positioning and storage on the surface.

3. A system according to claim 1, characterized in that said auxiliary tube is mounted on a mobile unit of a coiled tubing type for operations on request.

4. A system according to claim 1, characterized in that said auxiliary tube is mounted permanently, in a resident mode, on a well.

5. A system according to claim 1, characterized in that the inert material of said cylinder encapsulation is a polymer which is continuously extrudable in great lengths.

6. A system according to claim 1, characterized in that the support cables are metal cables.

7. A system according to claim 1, characterized in that the material of the tubular core is chosen so as to withstand the inhibiting agents used.

8. A system according to claim 1, characterized in that the auxiliary injection tube is held in position on the surface by a sheave on which the auxiliary injection tube is engaged.

9. A system according to claim 1, characterized in that a second encapsulation is provided between the central metal tubular core and the first-mentioned cylindrical encapsulation.

10. A system according to claim 9, characterized in that a third encapsulation is provided so as to coat the first-mentioned cylindrical encapsulation.

11. A system according to claim 1, characterized in that in use the auxiliary injection tube comprises eight support cables disposed symmetrically with respect to the longitudinal axis of symmetry of the central tubular core.

* * * * *